United States Patent
Chen et al.

(10) Patent No.: US 9,363,028 B2
(45) Date of Patent: Jun. 7, 2016

(54) APPARATUS AND METHODS FOR CATALOG DATA DISTRIBUTION

(71) Applicant: Time Warner Cable Enterprises LLC, New York, NY (US)

(72) Inventors: David Chen, Jamison, PA (US); Vipul Patel, Upper Holland, PA (US); Jian Yu, Ashburn, VA (US)

(73) Assignee: Time Warner Cable Enterprises LLC, New York, NY (US)

( * ) Notice: Subject to any disclaimer, the term of this patent is extended or adjusted under 35 U.S.C. 154(b) by 0 days.

(21) Appl. No.: 13/750,863

(22) Filed: Jan. 25, 2013

(65) Prior Publication Data

US 2014/0215539 A1    Jul. 31, 2014

(51) Int. Cl.
| | |
|---|---|
| H04N 7/173 | (2011.01) |
| H04H 60/96 | (2008.01) |
| H04N 21/2365 | (2011.01) |
| H04N 21/239 | (2011.01) |
| H04N 21/266 | (2011.01) |
| H04H 60/74 | (2008.01) |

(52) U.S. Cl.
CPC .............. *H04H 60/96* (2013.01); *H04H 60/74* (2013.01); *H04N 21/2365* (2013.01); *H04N 21/2393* (2013.01); *H04N 21/266* (2013.01)

(58) Field of Classification Search
CPC ................ H04N 7/17336; H04N 21/47202; H04N 7/17318
USPC .............. 725/91–93, 114–116; 709/219, 226, 709/228–232, 218
See application file for complete search history.

(56) References Cited

U.S. PATENT DOCUMENTS

| | | | | |
|---|---|---|---|---|
| 5,029,014 | A * | 7/1991 | Lindstrom | G11B 27/002 348/E7.024 |
| 6,160,545 | A * | 12/2000 | Eyer | H04N 5/44543 348/569 |
| 6,542,546 | B1 * | 4/2003 | Vetro | H04L 29/06 375/240.12 |
| 6,754,905 | B2 * | 6/2004 | Gordon | H04N 5/44543 348/384.1 |
| 7,500,258 | B1 * | 3/2009 | Eldering | H04N 7/165 725/134 |
| 7,617,510 | B2 | 11/2009 | Zigmond et al. | |
| 7,676,720 | B2 | 3/2010 | Strasman et al. | |
| 7,751,315 | B1 | 7/2010 | Pai | |
| 7,900,231 | B2 | 3/2011 | Paxton et al. | |
| 7,953,160 | B2 | 5/2011 | Gordon et al. | |
| 7,954,131 | B2 | 5/2011 | Cholas | |
| 8,135,020 | B1 | 3/2012 | Zhang et al. | |
| 2003/0056217 | A1 | 3/2003 | Brooks | |
| 2003/0159143 | A1 | 8/2003 | Chan | |
| 2004/0181811 | A1 | 9/2004 | Rakib | |
| 2006/0010477 | A1 | 1/2006 | Yu | |
| 2007/0022032 | A1 | 1/2007 | Anderson | |

(Continued)

*Primary Examiner* — Annan Shang
(74) *Attorney, Agent, or Firm* — Gazdzinski & Associates, PC

(57) ABSTRACT

Methods and apparatus for providing enhanced catalog data capacity and functionality within a content distribution network. In one embodiment, the apparatus includes an architecture configured to utilize an upstream out-of-band (OOB) channel for upstream catalog data request carriage, while a downstream in-band (IB) QAM is used for carriage of the catalog data issued by the network in response to the request. In another embodiment, the extant catalog structure is largely retained, yet modified so as to (i) eliminate redundancy within "barker" channel audio/video data delivery, and (ii) reduce the encoding resolution of the barker audio and/or video so as to utilize less bandwidth, thereby allowing enhanced capacity for catalog title expansion (and/or reduced latency in responding to catalog requests).

18 Claims, 11 Drawing Sheets

(56) References Cited

U.S. PATENT DOCUMENTS

| | | | |
|---|---|---|---|
| 2010/0299715 A1* | 11/2010 | Slothouber | H04N 21/235 725/118 |
| 2010/0313225 A1 | 12/2010 | Cholas | |
| 2011/0093900 A1 | 4/2011 | Patel | |
| 2011/0258665 A1* | 10/2011 | Fahrny | H04N 21/4334 725/47 |
| 2011/0302604 A1 | 12/2011 | Halen et al. | |
| 2012/0072946 A1* | 3/2012 | Cranman | H04N 21/4312 725/28 |

* cited by examiner

US 9,363,028 B2

APPARATUS AND METHODS FOR CATALOG DATA DISTRIBUTION

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The disclosure relates generally to the field of data and content delivery, such as via a content distribution or other network. In one exemplary aspect, the disclosure relates to network configurations and infrastructure to support, e.g., on-demand content titles and "barker" content.

2. Description of Related Technology

Video-on-demand (VOD) and similar technologies utilize catalog systems to enable network users (e.g., subscribers) to view and select from a large number of content titles. However, with the proliferation of more and more available titles (e.g., for movies, short videos, etc.), the extant catalog infrastructure is becoming a limiting factor. For instance, currently deployed VOD catalog delivery systems in cable networks may typically be designed to support only a certain number of VOD titles (in one embodiment up to 7500) VOD titles. In systems where the catalog offerings exceed this threshold, network users may experience errors when navigating the catalog menus. Such errors can be frustrating and reduce user experience and satisfaction with the service provider, thereby potentially leading to subscriber loss. This problem will only be exacerbated as the pool of potential available titles inevitably grows with time.

In a typical existing catalog system used in a cable network, VOD catalog data is delivered on a one-way data broadcast carousel. A VOD carousel server creates e.g., several single program transport streams (or SPTS, such as defined by ISO 13818-1), each containing audio and video streams of respective so-called "barker" channels, and data streams. See FIG. 1. As used in the present context, such "barker" content relates without limitation to on-screen and/or audio content or messaging from the network to network users (e.g., previews, clips, and/or status, mode, alert, or other types of messaging or data delivery). VOD catalog data is spread across the aforementioned data streams contained in the SPTSs. The SPTSs at the output of the VOD carousel server are multiplexed into a MPTS (multiple program transport stream) with several programs on a MPEG-2 transport multiplexer (within a given QAM). The resulting MPTS is then distributed over the network (e.g., cable plant) to the end users.

At the end user's premises, a VOD client (e.g., software process) on the user's consumer premises equipment (CPE; e.g., set-top box) tunes to a different program stream within same delivered transport stream (MPTS) in order to download the catalog data if the desired data is on another program. In the typical implementation, all of the SPTSs have a copy of the barker channel audio and video streams, and hence there are several identical copies of audio and video (barker) streams on the delivered MPTS.

The aforementioned barker audio and video streams may, depending on their content, consume significant amounts of bandwidth as well (even in one instance, let alone several instances). Thus, the aforementioned MPTS/QAM can rapidly become clogged or limited in its capacity to carry VOD catalog data, since the (redundant) barker channels consume such significant bandwidth. While additional QAMs may feasibly be added to provide additional bandwidth for the catalog data, additional bandwidth, which may not be available on the system, is required for these additional QAMs.

Hence, there is a need for improved methods and apparatus which provide enhanced capability to provide network users with catalog services supporting an expanded number of titles for e.g., VOD services, while ideally minimizing bandwidth consumption (the latter which could be used, for example, to service additional users with data/content).

SUMMARY

The foregoing needs are addressed herein by providing, inter alia, methods and apparatus for enhancing catalog data and barker channel support in a content distribution network.

In a first aspect, a method of operating a content distribution network is disclosed. In one embodiment, the network has a plurality of users associated therewith, and the method operates so as to provide content catalog services, and includes: providing a plurality of catalog data streams; associating each of the catalog data streams with a single secondary content channel; forming the plurality of catalog streams and single secondary content streams into a common stream; and delivering the common stream to each of the plurality of users, such that each of the users can access each of the catalog data streams and the single secondary content stream.

In one variant, the single secondary content channel comprises a barker channel having at least one audio stream and at least one video stream.

In another variant, the content distribution network is a hybrid topology managed network selected from the group consisting of: (i) a hybrid fiber coaxial (HFC) network, and (ii) a hybrid fiber copper (HFCu) network.

In a further variant, the barker channel is configured to be rendered within some fraction of a full sized rendering device screen, and the method further includes reducing an encoding resolution of at least one of the at least one audio stream and/or the at least one video stream prior to said forming.

In yet another variant, the associating includes configuring a program mapping table (PMT) with respect to each of the catalog data streams so as to share one or more streams with packet IDs (PIDs).

In a second aspect, a method of operating a content distribution network having a plurality of users associated therewith so as to provide content catalog data is disclosed. In one embodiment, the method includes: utilizing a first channel to carry a catalog data request originated from one of the plurality of users; utilizing a catalog data service to carry a first portion of the catalog data accessible to the one user; and utilizing a second channel to carry a second portion of the catalog data, the second portion corresponding to data requested by the one user.

In one variant, the first portion is broadcast via the catalog data service to each of the plurality of users, the first channel is an upstream out-of-band (OOB) channel, and the second channel is an in-band (IB) content delivery QAM channel.

In another variant, the first portion comprises: (i) barker channel content, and (ii) top-level catalog data, and the second portion further comprises addressing data specific to the consumer premises equipment (CPE) of the one user.

In a third aspect, network apparatus configured for delivery of catalog data to a plurality of users of the network is disclosed. In one embodiment, the apparatus includes: a catalog server configured to provide catalog data in response to a request from a user; a data processing entity configured to assemble a response targeted to the user and including the catalog data; and transmission apparatus configured to modulate the assembled response and deliver it to the network for targeted distribution to the user.

In one variant, the data processing entity further includes logic configured to utilize a MAC address of a consumer premises device associated with the user to enable said targeted distribution, and the network apparatus further includes an interface to an upstream channel, the upstream channel used to carry the request from the user.

In a fourth aspect of the invention, client apparatus for use in a content distribution apparatus is disclosed. In one embodiment, the apparatus includes: a tuner configured to tune to at least one prescribed channel; filtration logic; a processor; and a storage device in data communication with the processor and comprising at least one computer program.

In one variant, the at least one program is configured to: receive a signal received by the tuner and filtered by the filtration logic; and further filter the signal to identify whether catalog response data constituent in the signal is specifically targeted for the client apparatus.

In another variant, the filtration logic comprises a hardware-based filter, and the signal comprises a multiple program transport stream (MPTS) signal which comprises a first address portion and a second address portion, the first address portion being useful by the hardware-based filter to perform a first level of filtration. The second address portion is useful for, inter alia, the at least one computer program to perform said further filtration.

In another aspect, a method of filtering an incoming transport stream so as to identify targeted in-band catalog request response data is disclosed.

In yet another aspect, a computer readable apparatus is disclosed. In one embodiment, the apparatus includes a storage medium with logic contained thereon, which when executed, implements remapping of PMT and PID data so as to enable use of a single barker channel for multiple programs.

In yet a further aspect, a catalog data system is disclosed. In one embodiment, the system includes both network (e.g., headend) and client-side components which coordinate to enable targeted delivery of request-specific catalog data to specific users via one or more in-band channels.

Other features and advantages of the present disclosure will immediately be recognized by persons of ordinary skill in the art with reference to the attached drawings and detailed description of exemplary embodiments as given below.

Figure 1:
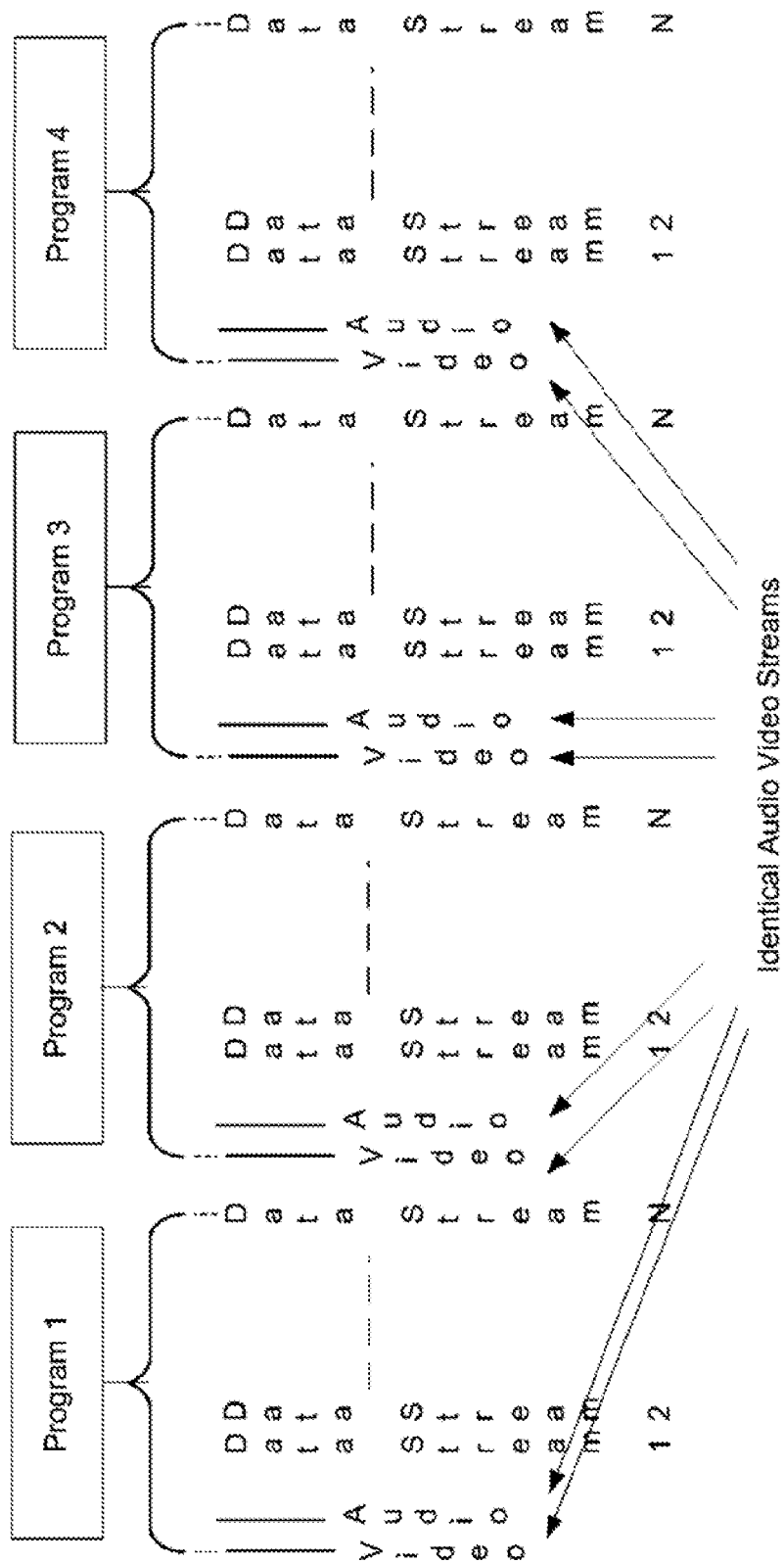
FIG. 1 is a graphical representation of a typical prior art VOD catalog service including four (4) SPTS with four associated (redundant) barker channels.

All Figures © Copyright 2012 Time Warner Cable, Inc. All rights reserved.

DETAILED DESCRIPTION

Reference is now made to the drawings wherein like numerals refer to like parts throughout.

As used herein, the term "application" refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, and smartphones.

As used herein, the term "codec" refers to a video, audio, or other data coding and/or decoding algorithm, process or apparatus including, without limitation, those of the MPEG (e.g., MPEG-1, MPEG-2, MPEG-4/H.264, etc.), Real (RealVideo, etc.), AC-3 (audio), DiVX, XViD/ViDX, Windows Media Video (e.g., WMV 7, 8, 9, 10, or 11), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

The terms "Consumer Premises Equipment (CPE)" and "host device" refer without limitation to any type of electronic equipment located within a consumer's or user's premises and connected to a network. The term "host device" includes terminal devices that have access to digital television content via a satellite, cable, or terrestrial network. The host device functionality may be integrated into a digital television (DTV) set. The term "consumer premises equipment" (CPE) includes such electronic equipment such as set-top boxes, televisions, Digital Video Recorders (DVR), gateway storage devices (Furnace), and ITV Personal Computers.

As used herein, the term "database" refers generally to one or more tangible or virtual data storage locations, which may or may not be physically co-located with each other or other system components.

As used herein, the terms "display" and "rendering device" mean any type of device adapted to display information or content, including without limitation CRTs, LCDs, TFTs, plasma displays, LEDs, incandescent and fluorescent devices. Display devices may also include less dynamic devices such as, for example, printers, e-ink devices, and the like.

As used herein, the term "DVR" (digital video recorder) refers generally to any type or recording mechanism and/or software environment whereby content sent over a network can be recorded and selectively recalled. Such DVR may be dedicated in nature, or part of a non-dedicated or multi-function system.

As used herein, the term "DOCSIS" refers to any of the existing or planned variants of the Data Over Cable Services Interface Specification, including for example DOCSIS versions 1.0, 1.1, 2.0 and 3.0.

As used herein, the term gateway includes, without limitation, devices configured to interface with a network, and pass signals to or exchange signals with, another device in communication therewith. Various exemplary gateways are described in, inter alia, co-owned U.S. patent application Ser. No. 11/818,236 filed on Jun. 13, 2007 entitled "PREMISES GATEWAY APPARATUS AND METHODS FOR USE IN A CONTENT-BASED NETWORK", which issued as U.S. Pat. No. 7,954,131 on Dec. 18, 2008, U.S. patent application Ser. No. 12/582,619 filed on Oct. 20, 2009 and entitled "GATEWAY APPARATUS AND METHODS FOR DIGITAL CONTENT DELIVERY IN A NETWORK", which issued as U.S. Pat. No. 9,027,062 on Apr. 21, 2011, and co-pending U.S. patent application Ser. No. 12/480,597 filed on Jun. 8, 2009 and entitled "MEDIA BRIDGE APPARATUS AND METHODS", each of the foregoing being incorporated herein by reference in its entirety.

As used herein, the term "headend" refers generally to a networked system controlled by an operator (e.g., an MSO or multiple systems operator) that distributes programming to MSO clientele using client devices. Such programming may include literally any information source/receiver including, inter alia, free-to-air TV channels, pay TV channels, interactive TV, and the Internet.

As used herein, the terms "Internet" and "internet" are used interchangeably to refer to inter-networks including, without limitation, the Internet.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer without limitation to a cable, fiber to the home (FTTH), fiber to the curb (FTTC), satellite, Hybrid Fiber Copper (HFCu), or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, HFCu networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols.

As used herein, the term "interface" refers to any signal, data, or software interface with a component, network or process including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.) or IrDA families.

As used herein, the term "node" refers to any functional entity associated with a network, such as for example an OLT or ONU, whether physically discrete or distributed across multiple locations.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the scheme(s).

As used herein, the term "server" refers to any computerized component, system or entity regardless of form which is adapted to provide data, files, applications, content, or other services to one or more other devices or entities on a computer system or network.

As used herein, the term "service", "content", "program" and "stream" are sometimes used synonymously to refer to a sequence of packetized data that is provided in what a subscriber may perceive as a service. A "service" (or "content", or "stream") in the former, specialized sense may correspond to different types of services in the latter, non-technical sense. For example, a "service" in the specialized sense may correspond to, among others, video broadcast, audio-only broadcast, pay-per-view, or video-on-demand. The perceivable content provided on such a "service" may be live, pre-recorded, delimited in time, undelimited in time, or of other descriptions. In some cases, a "service" in the specialized sense may correspond to what a subscriber would perceive as a "channel" in traditional broadcast television.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, RFID, NFC, acoustic, and infrared (i.e., IrDA).

Overview

In one salient aspect, the present disclosure provides various solutions to enhance catalog functionality in a content distribution network (such as e.g., a cable television or other network making use of catalog services).

In a first variant, a two-way approach making use of both out-of-band (OOB) upstream messaging and downstream "in band" assets is utilized. Metadata associated with the barker content (e.g., for menu screens) is sent on in-band or out-of-band QAM from the network-side carousel server to the user's CPE. This approach advantageously retains extant carousel server systems and infrastructure.

In a second variant, duplicated barker channels are eliminated, and hence support for more catalog titles results. As noted above with respect to FIG. 1, currently 4 SPTS's carry identical barker channels in a typical plant. The exemplary implementation provided herein eliminates 3 of these 4 barker channels, and has 4 carousel programs share the single remaining barker channel, thereby providing significant bandwidth savings.

In another variant, the video resolution of barker channel content is reduced over that currently supplied, which reduces bandwidth consumption (thereby making room for additional title carriage), and advantageously requires no modifications to existing plant structure. This latter approach can also be combined with the former approaches if desired.

DETAILED DESCRIPTION OF EXEMPLARY EMBODIMENTS

Exemplary embodiments of enhanced catalog and barker data apparatus and methods of are now described in detail. While these exemplary embodiments are described in the context of a hybrid fiber coax (HFC) cable architecture having a multiple systems operator (MSO), digital networking capability, and plurality of client devices/CPE, the general principles and advantages of the disclosure may be extended to other types of networks and architectures, whether broadband, narrowband, wired or wireless, content or data, or otherwise. Hence, the following description is merely exemplary in nature. For example, the various aspects of the disclosure may be practiced over a fiber-to-the-home (FTTH) or fiber-to-the-curb (FTTC) system, or over satellite or millimeter wave-based networks having two-way capabilities similar to today's digital cable HFC networks.

It will also be appreciated that while described generally in the context of a network providing service to a customer or consumer (i.e., residential) end user domain, the various aspects of the present disclosure may be readily adapted to other types of environments including, e.g., commercial/enterprise, and government/military applications. Myriad other applications are possible.

Moreover, while described primarily in the context of so-called "video on demand" or VOD services within a hybridized content delivery network (e.g., cable television HFC, or hybrid fiber/copper (HFCu) network), it is recognized that the various aspects of the present disclosure are in no way so limited, and in fact may be applied to different types of networks and/or different types of content delivery paradigms which employ a catalog functionality, such as Startover, Lookback, electronic program guide (EPG), services for providing "YellowPage" functionality, "classified advertisement" functionality, sport scores and statistics, news feeds, and the like.

Also, while certain aspects are described primarily in the context of the well known IP or Internet Protocol (described in, inter alia, RFC 791 and 2460), other types of protocols (and in fact bearer networks to include other internets and intranets) may be used to implement the described functionality.

Bearer Network Architecture

Figure 2:
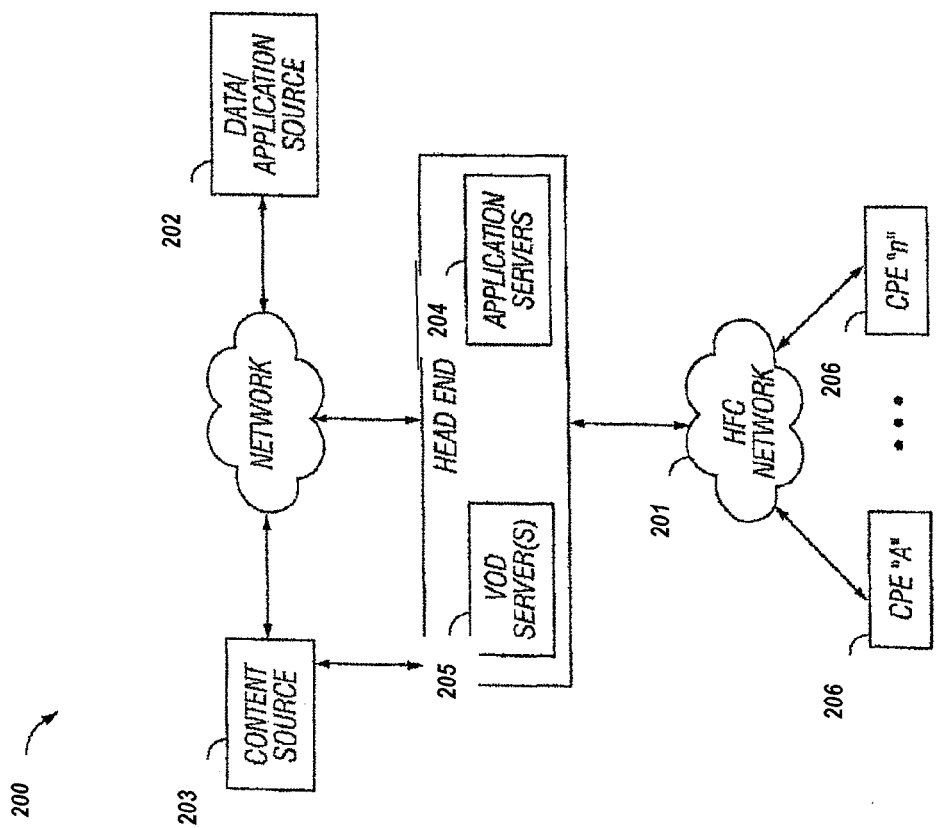
FIG. 2 is a functional block diagram illustrating an exemplary HFC cable network configuration useful with the various aspects of the present disclosure.

FIG. 2l illustrates a typical content distribution network configuration with which the enhanced catalog apparatus and methods of the present disclosure may be used. The various components of the network 200 include (i) one or more data and application origination points 202; (ii) one or more content sources 203, (iii) one or more application distribution servers 204; (iv) one or more VoD servers 205 and associated catalog servers (see discussion of FIG. 3A herein), and (v) consumer premises equipment (CPE) 206. The distribution server(s) 204, VoD servers 205, catalog server(s), and CPE(s) 206 are connected via a bearer (e.g., HFC) network 201. A simple architecture comprising one of each of the aforementioned components 202, 204, 205, 206 is shown in FIG. 2 for clarity, although it will be recognized that comparable architectures with multiple origination points, distribution servers, VoD servers, catalog servers, and/or CPE devices (as well as different network topologies) may be utilized consistent with the disclosure. For example, the headend architecture of FIG. 2a (described in greater detail below) may be used.

The data/application origination point 202 comprises any medium that allows data and/or applications (such as a VoD-based application, gaming application, or "Watch TV" application) to be transferred to a distribution server 204. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 204 comprises a computer system where such applications can enter the network system. Distribution servers are well known in the networking arts, and accordingly not described further herein.

The VoD server 205 comprises a computer system where on-demand content can be received from one or more of the aforementioned data sources 202 and enter the network system. These servers may generate the content locally, or alternatively act as a gateway or intermediary from a distant source.

The CPE 206 includes any equipment in the "customers' premises" (or other locations, whether local or remote to the servers 204, 205) that can be accessed by a distribution server 204 or VOD server 205.

Figure 2A:
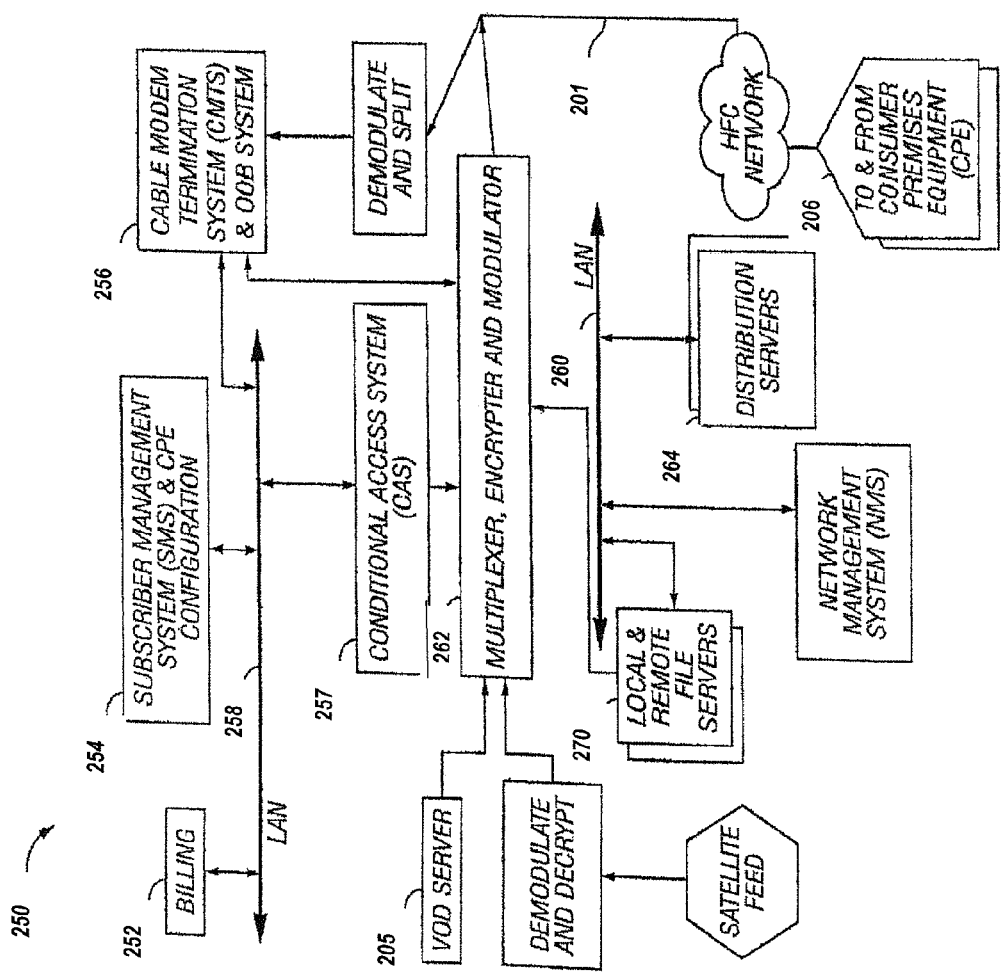
FIG. 2a is a functional block diagram illustrating one exemplary HFC cable network headend configuration useful with the various aspects of the present disclosure.

Referring now to FIG. 2a, one exemplary embodiment of headend architecture useful with the present disclosure is described. As shown in FIG. 2a, the headend architecture 250 comprises typical headend components and services including billing module 252, subscriber management system (SMS) and CPE configuration management module 254, cable-modem termination system (CMTS) and OOB system 256, as well as LAN(s) 258, 260 placing the various components in data communication with one another. It will be appreciated that while a bar or bus LAN topology is illustrated, any number of other arrangements as previously referenced (e.g., ring, star, etc.) may be used consistent with the disclosure. It will also be appreciated that the headend configuration depicted in FIG. 2a is high-level, conceptual architecture and that each MSO may have multiple headends deployed using custom architectures.

The architecture 250 of FIG. 2a further includes a multiplexer/encrypter/modulator (MEM) 262 coupled to the HFC network 201 adapted to "condition" content for transmission over the network. The distribution servers 264 are coupled to the LAN 260, which provides access to the MEM 262 and network 201 via one or more file servers 270. The VoD servers 205 are coupled to the LAN 260 as well, although other architectures may be employed (such as for example where the VoD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 250 to the CPE 206 ("downstream") are multiplexed together in the headend and sent to neighborhood hubs (FIG. 2b) via a variety of interposed network components.

Content (e.g., audio, video, data, applications, etc.) is provided in each downstream (in-band) channel associated with the relevant service group. To communicate with the headend or intermediary node (e.g., hub server), the CPE 206 may use the out-of-band (OOB) or DOCSIS channels and associated protocols. The OCAP 1.0, 2.0, 3.0 (and subsequent) specification provides for exemplary networking protocols both downstream and upstream, although the disclosure is in no way limited to these approaches.

Figure 2B:
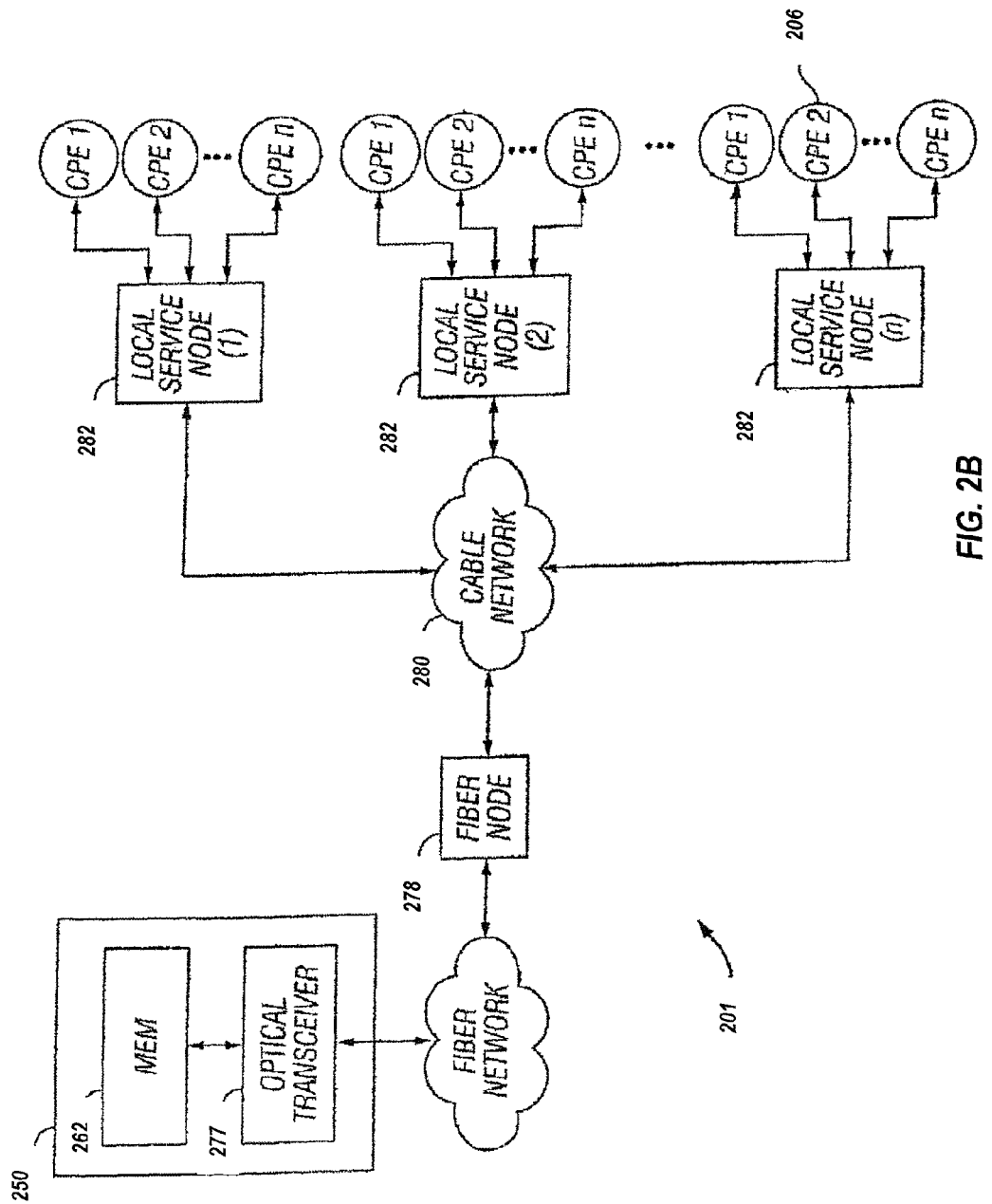
FIG. 2b is a functional block diagram illustrating one exemplary local service node configuration useful with the various aspects of the present disclosure.

As shown in FIG. 2b, the network 201 of FIGS. 2 and 2a comprises a fiber/coax arrangement wherein the output of the MEM 262 of FIG. 2a is transferred to the optical domain (such as via an optical transceiver 277 at the headend or further downstream). The optical domain signals are then distributed to a fiber node 278, which further distributes the signals over a distribution network 280 to a plurality of local servicing nodes 282. This provides an effective 1:N expansion of the network at the local service end.

"Switched" Networks

Figure 2C:
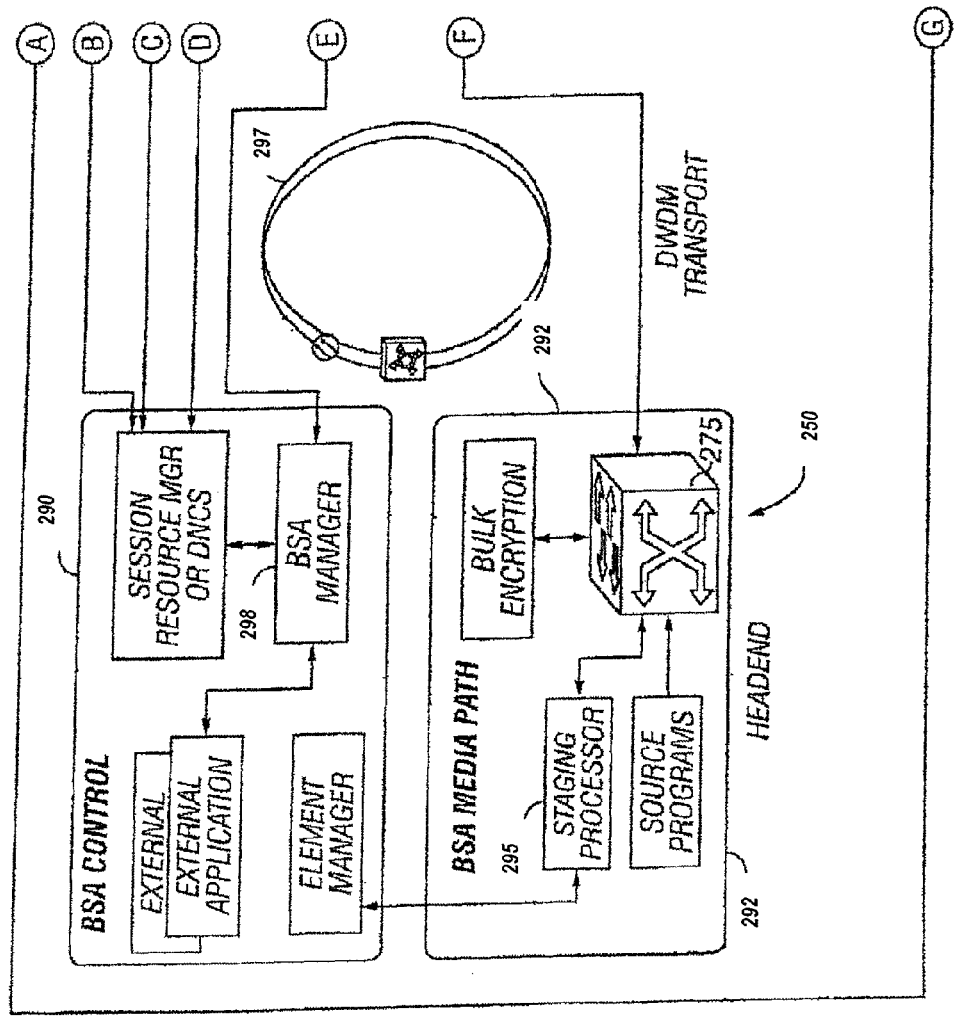
FIG. 2c is a functional block diagram illustrating one exemplary broadcast switched architecture (BSA) network useful with the various aspects of the present disclosure.
Figure 2C:
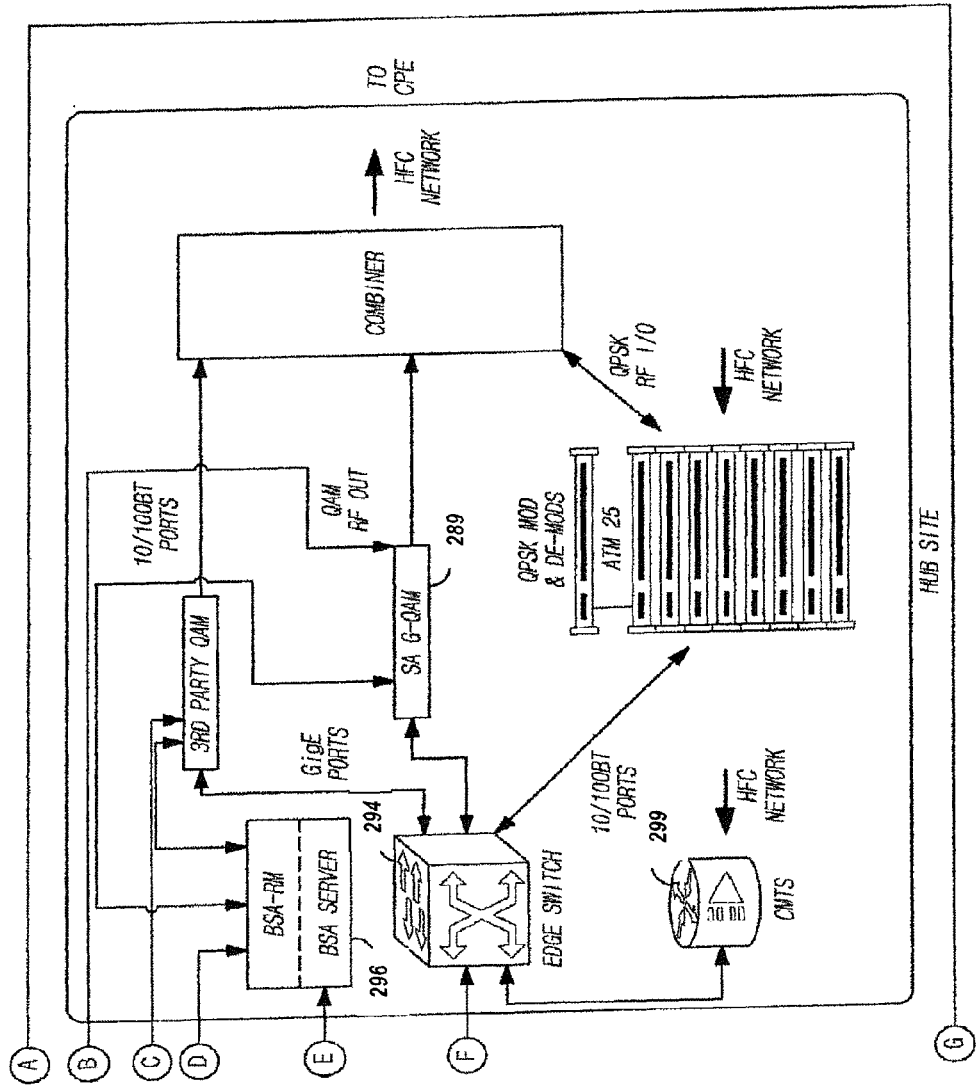

FIG. 2c illustrates an exemplary "switched" network architecture also useful with the present disclosure. Switching architectures allow improved efficiency of bandwidth use for ordinary digital broadcast programs. Ideally, the subscriber will be unaware of any difference between programs delivered using a switched network and ordinary streaming broadcast delivery.

FIG. 2c shows the implementation details of one exemplary embodiment of this broadcast switched network architecture. Specifically, the headend 250 contains switched broadcast control and media path functions 290, 292; these element cooperating to control and feed, respectively, downstream or edge switching devices 294 at the hub site which are used to selectively switch broadcast streams to various service groups. A BSA server 296 is also typically disposed at the hub site, and implements functions related to switching and bandwidth conservation (in conjunction with a management entity 298 disposed at the headend). An optical transport ring 297 is utilized to distribute the dense wave-division multiplexed (DWDM) optical signals to each hub in an efficient fashion.

Co-owned U.S. patent application Ser. No. 09/956,688 filed Sep. 20, 2001 and entitled "Technique for Effectively Providing Program Material in a Cable Television System", which issued as U.S. Pat. No. 8,713,623 on Mar. 20, 2003 and is incorporated herein by reference in its entirety, describes one exemplary broadcast switched digital architecture useful with the present disclosure, although it will be recognized by those of ordinary skill that other approaches and architectures may be substituted.

In addition to "broadcast" content (e.g., video programming), the systems of FIGS. 2a-2c can also deliver Internet data services using the Internet protocol (IP), although other protocols and transport mechanisms of the type well known in the digital communication art may be substituted. One exemplary delivery paradigm comprises delivering MPEG-based video content (e.g., "IPTV" or the like), with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable or other modem.

Referring again to FIG. 2c, the IP packets associated with Internet services are received by edge switch 294, and forwarded to the cable modem termination system (CMTS) 299. The CMTS examines the packets, and forwards packets intended for the local network to the edge switch 294. Other packets are discarded or routed to another component. The edge switch 294 forwards the packets receive from the CMTS 299 to the QAM modulator 289, which transmits the packets on one or more physical (QAM-modulated RF) channels to the CPEs (or CD). The IP packets are typically transmitted on RF channels that are different than the RF channels used for the broadcast video and audio programming, although this is not a requirement. The CPE 206 are each configured to monitor the particular assigned RF channel (such as via a port or socket ID/address, or other such mechanism) for IP packets intended for the subscriber premises/address that they serve.

Packet-Optimized Architectures

Figure 2D:
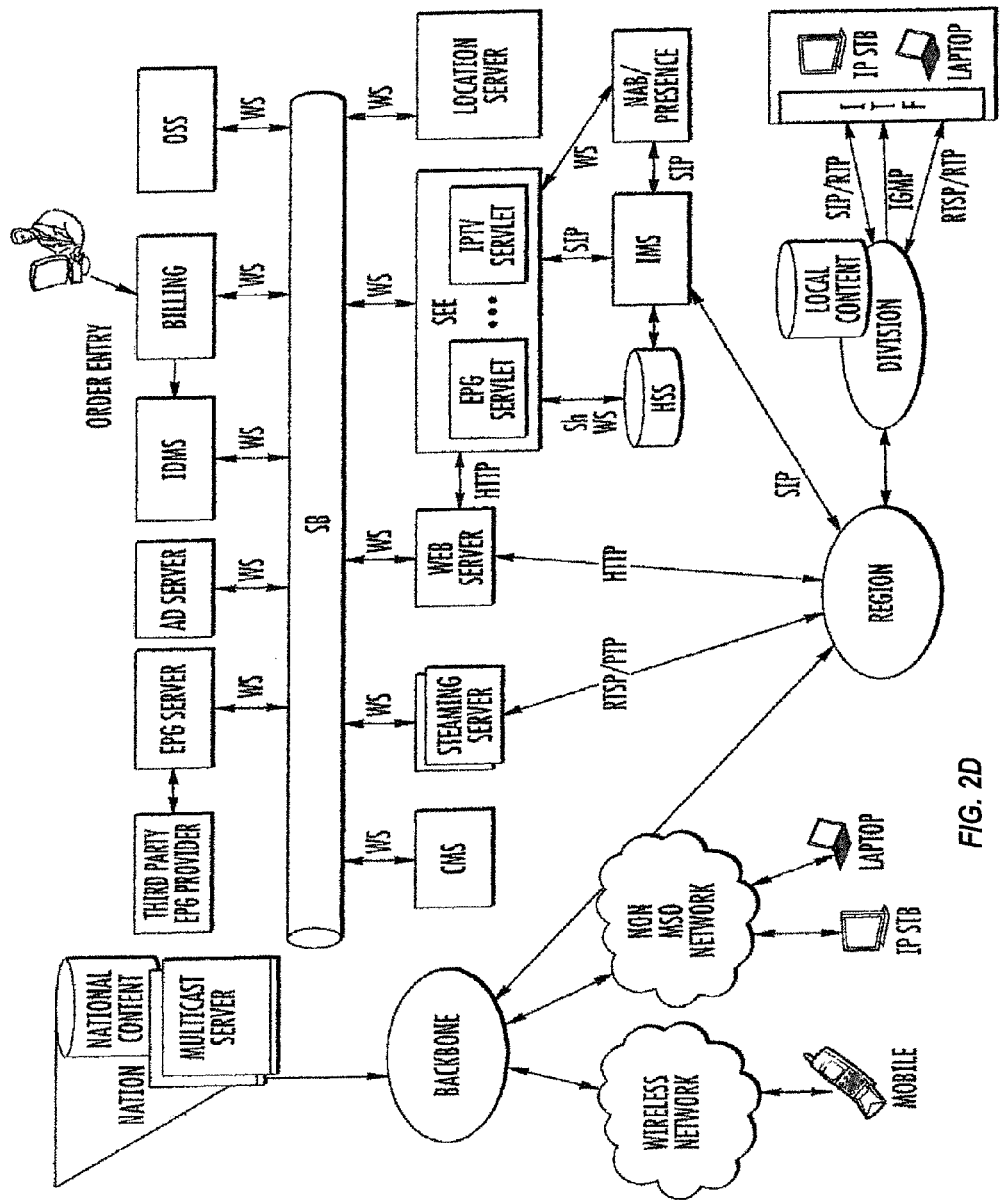
FIG. 2d is a functional block diagram illustrating one exemplary packetized content delivery network architecture useful with the various aspects of the present disclosure.

While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment of the present disclosure, a "packet optimized" delivery network is used for carriage of the packet content (e.g., IPTV content) when the request issues from an MSO network (see discussion of FIG. 2a below). FIG. 2d illustrates one exemplary implementation of such a network, in the context of an IMS (IP Multimedia Subsystem) network with common control plane and service delivery platform (SDP), as described in co-owned U.S. Provisional Patent Application Ser. No. 61/256,903 entitled "METHODS AND APPARATUS FOR PACKETIZED CONTENT DELIVERY OVER A CONTENT DELIVERY NETWORK", previously incorporated herein. Such a network provides significant enhancements in terms of common control of different services, implementation and management of content delivery sessions according to unicast or multicast models, quality-of-service (QoS) for IP-packetized content streams, etc.; however, it is appreciated that the various features of the present disclosure are in no way limited to any of the foregoing architectures.

Expanded Catalog Capacity Solutions

As indicated previously, current implementations of catalog data delivery systems are exceeding their design limitations on, inter alia, the number of titles that can be carried without negative impact on user experience (e.g., undue latency, failure or error messages, etc.).

Hence, the present disclosure advantageously provides long-term solutions focused on supporting many more titles, so as to not only service extant titles, but also provide for significant future expansion. Exemplary embodiments of the various solutions disclosed herein accordingly target a value of 30K+ titles (i.e., factor of four (4) over the exemplary prior art value of 7500) to be supported without any detrimental effects on user experience. Specifically, there is a physical limitation on how much data can be put onto a fixed bandwidth. Based on various assumptions and calculations discussed infra, a single QAM256 can support approximately 30K titles of average size 625 bytes or less. Further expansion is difficult due to physics/mathematics limitation in any given single QAM. Additional QAMs may be added, but this poses its own problems, including robbing the plant of otherwise useable bandwidth. Notwithstanding, it will be appreciated that the foregoing target number is based on the assumptions and calculations provided herein for a particular plant architecture, and hence is merely illustrative of the broader principles of the disclosure, the systems and methods discussed herein may be equally applicable to systems having different target numbers, etc.

Solution 1—Two-Way U/S OOB, D/S IB-Based

The first solution of the present disclosure includes, at a high level, the usage of the extant carousel architecture (essentially for "bare minimum" contents), along with "two-way" on-demand (OD) requests for content that is not on the carousel.

As with most applications, the bandwidth requirement for VOD catalog requests is asymmetric. Very little upstream (i.e., client to network) bandwidth is required, but a much bigger downstream (network to client) bandwidth is needed. The exemplary embodiment of the first solution uses OOB upstream channel(s) for the client-generated requests, but uses in-band (IB) (i.e., the existing carousel QAM), and not OOB, for downstream replies to the requests. With this approach, the architecture can support a virtually unlimited amount of titles, with minimum impact on the OOB upstream channel(s), and no impact on the OOB downstream channel(s). In other words, this solution replaces the existing QAM without a need for any additional QAM to add more titles. It is further appreciated that the aforementioned 30K limit regards a specific product requirement, the solution disclosed herein may be used with other products including those which have different requirements/limits (or no limits).

Specifically, in one exemplary implementation, only a minimum amount of info' illation is carried on the carousel, including: (i) a barker audio/video stream; (ii) VOD category data, and top level folders and titles; and (iii) optionally (configurable) lower level sub-folders and titles. In the exemplary implementation, these contents carried on the carousel are broadcasted to the IB QAM, and accessible to all CPE 206 on the network.

All other catalog-related contents are obtained from a "two-way" communication paradigm using OOB assets on the upstream portion of the communication, and in-band (IB) assets on the downstream portion. Specifically, extant OOB channels are used for upstream communications/requests (minimum upstream bandwidth is required, based on the exemplary calculations and assumptions provided below). The extant IB VOD carousel QAM is used for downstream replies, which may include the requested catalog data. Accordingly, a large amount of IB QAM bandwidth is available for carriage of downstream replies. The downstream data carried on the VOD carousel QAM(s) is targeted to client devices based on e.g., their MAC address (e.g., MAC-48, EUI-48, or EUI-64) or other addressing information, such as an IP address and local (premises) network address. The CPE's MAC address may also be used for filtering purposes, as described in greater detail infra with respect to FIG. 4. Use of the MAC in the exemplary implementation described herein further advantageously has little or no impact on the CPE's CPU usage or processing burden.

It will be appreciated that the foregoing "two-way" approach only encounters limitations on the number of simultaneous network users (because bandwidth is only used when a user requests data) However, there can be unlimited amount of VOD titles/catalog data in the VOD library since the network is not used if no user is requesting for them. Thus, the goal of (ultimately) providing expansion for a much large number of titles is achieved.

In the context of the exemplary HFC cable plant of FIGS. 1-1C, both the extant carousel server and VOD client are modified to implement the foregoing two-way functionality. Specifically, the server is modified such that only bare minimum content (such as barker and top level menu data) is on the carousel. In addition, all data as result of user requests are on the dynamic data carousel (data which was not there before). Content on dynamic carousel can be transmitted once, or repeated a few times to ensure reliability. Further, the server is modified to read user request and put the data on dynamic carousel. Response data is encapsulated to a data section that uses CPE address to target to a particular CPE device. Additionally, the client is modified to use U/S OOB to request data that are not on the carousel. The CPE address is used to filter data that is targeted to it.

The following assumptions are made in the context of the exemplary cable television network for purposes of illustration of the foregoing concepts:

1 million CPE per headend (per VOD carousel QAM)
 20% of simultaneous VOD users at peak time=$0.2 \times 10E6$ CPE=200,000
 30 minutes of average watching duration per VOD asset
 20 "two-way" detailed information requests before each VOD order
 100 bytes average size per "two-way" request
 1024 bytes average size per "two-way" response
 1000 CPE per return path demodulator (RPD)

The following exemplary calculations for required downstream (in-band) and upstream (out-of-band) bandwidth are based on the foregoing assumptions:

1. Downstream in-band (IB) bandwidth required (data delivery for off-carousel contents):

$$200{,}000 \text{ (simultaneous users)} \times 20 \text{ (requests)} \times 1024 \text{ (bytes/request)} \times 8 \text{(bits/byte)} / (30 \text{ (minutes)} \times 60 \text{ (seconds per minute)}) = 18{,}204{,}444 \text{ bps} (18.20 \text{ Mbps}) \quad \text{Eqn. (1)}$$

2. Upstream out-of-band (OOB) return path demodulator (RPD) bandwidth required (upstream requests for off-carousel contents):

$$1000 \text{ (users per RPD)} \times 0.2 \text{ (simultaneous users)} \times 20 \text{ (requests)} \times 100 \text{ (bytes/request)} \times 8 \text{ (bits/byte)} / (30 \text{ (minutes)} \times 60 \text{ (seconds per minute)}) = 1.778 \text{ kbps.} \quad \text{Eqn. (2)}$$

Figure 3:
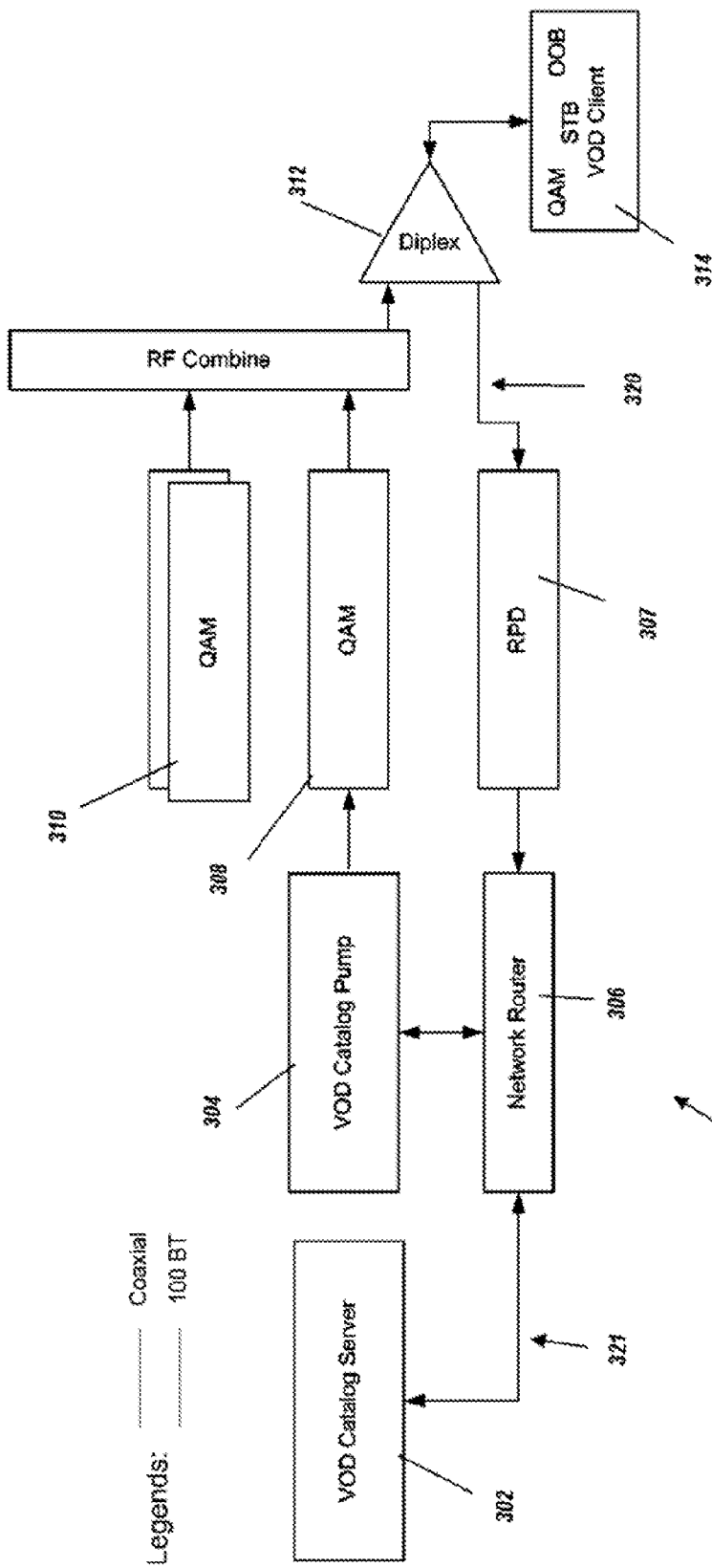
FIG. 3 is a high-level block diagram illustrating one embodiment of a network architecture for implementing enhanced catalog capability according to the disclosure.

FIG. 3 shows an exemplary embodiment of an end-to-end VOD catalog delivery system 300 according to the disclosure. The system 300 includes a VOD catalog server (VCS) 302, VOD catalog pump (VCP) 304, network router 306, return path demodulator (RPD) 307, and carousel QAM 308. In-band QAMs 310 are also illustrated, as well as a diplexer 312 which combines the various QAM signals for distribution downstream. A client VOD process 314 is resident on the user's CPE 206 as well. It will be appreciated that while the VCP and VCS are illustrated as separate components, these functions can be readily combined onto one hardware/software platform (e.g., a common) server, as well as being integrated with other components or functions. Accordingly, the architecture 300 of FIG. 3 is merely illustrative of one possible hardware/software configuration.

The illustrated communications pathways between the components in the architecture 300 of FIG. 3 include coaxial cabling 320, and non-coaxial cabling 321 (such as e.g., 100 BT or Fast Ethernet over untwisted shielded pair (100Base-TX), although it will be appreciated that other modalities may be used, such as e.g., Gigabit Ethernet, FireWire (IEEE Std. 1394), Thunderbolt™, and even wireless interfaces such as WLAN (e.g., IEEE Std. 802.11) or WMAN (e.g., IEEE Std. 802.16).

Figure 3A:
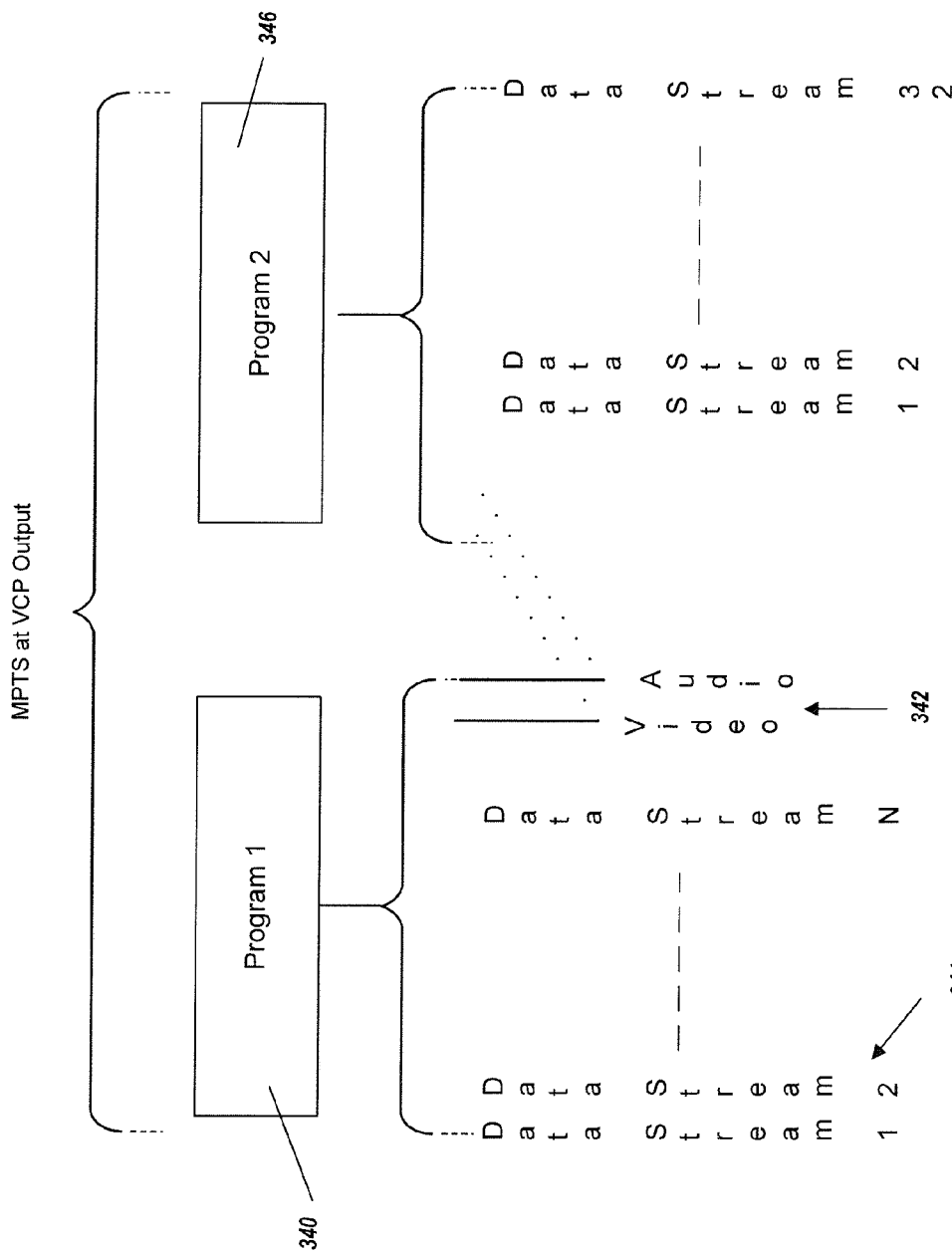
FIG. 3A is a graphical representation of one embodiment of VOD catalog service including a plurality (e.g., two) programs and a single common barker channel that are formed into an MPTS along with targeted addressing data using the architecture of FIG. 3.

In operation, the VCP 304 "pumps" an MPEG-2 MPTS having 2 programs (discussed below in greater detail) to the QAM (modulator) 308. As shown in FIG. 3A below, Program 1 340 of the multi-program transport stream (MPTS) contains video and audio streams of a barker channel 342, while the data streams 344 contains the contents of top level(s) VOD catalog(s) encapsulated to DigiCipher II (DCII) tables for e.g., exemplary Motorola® platforms, or to multi-protocol encapsulation (MPE) tables for other platforms. Program 2 346 shares same video and audio streams of the barker channel 342 (its program mapping table (PMT) contains the audio/video packet identifications (PIDs) of Program 1 340, also illustrated by dotted lines in FIG. 3A), and contains thirty-two (32) data streams in the illustrated implementation. Each data stream PID is identified by a stream descriptor with tag "$p_i$", where the index "i" ranges from a value of 0 to 31. These data streams carry the (encapsulated) reply of the VOD catalog data requests received from the CPE 206.

It is noted that in some implementations, it may be sufficient to have just one PID for carrying the response data (as opposed to one for each data stream). Only one MPEG Program 340 (instead of two) is needed in such case, because the single PID can be easily added to Program 1 340. However, it will be appreciated that an added benefit of safety is provided by having the response data spread across multiple PIDs, so that the bitrate associated with each PID does not exceed what the underlying hardware platform can handle (e.g., a maximum bitrate cap or limitation is not encountered, which may result in deleterious effects on e.g., user experience or quality). In the exemplary context of the aforementioned Motorola-based hardware architecture (e.g., DCT2000 device), numerous PIDs are supported in a PMT, and hence either of the foregoing approaches are readily supported (and yet additional Programs may be added to, e.g., further reduce peak bitrate if desired).

Referring again to FIG. 3A, when the VCS 302 receives a request from the VOD client of the user's CPE 206 for VOD catalog data, the server processes the request, and sends requested data (response) to the VCP 304 for encapsulation (e.g., into a DCII/MPEG-2 format); the VCP then streams the encapsulated data out to the QAM (modulator) 308, such as through an IP or ASI (asynchronous serial interface) for distribution to the client via the distribution network 201.

Figure 4:
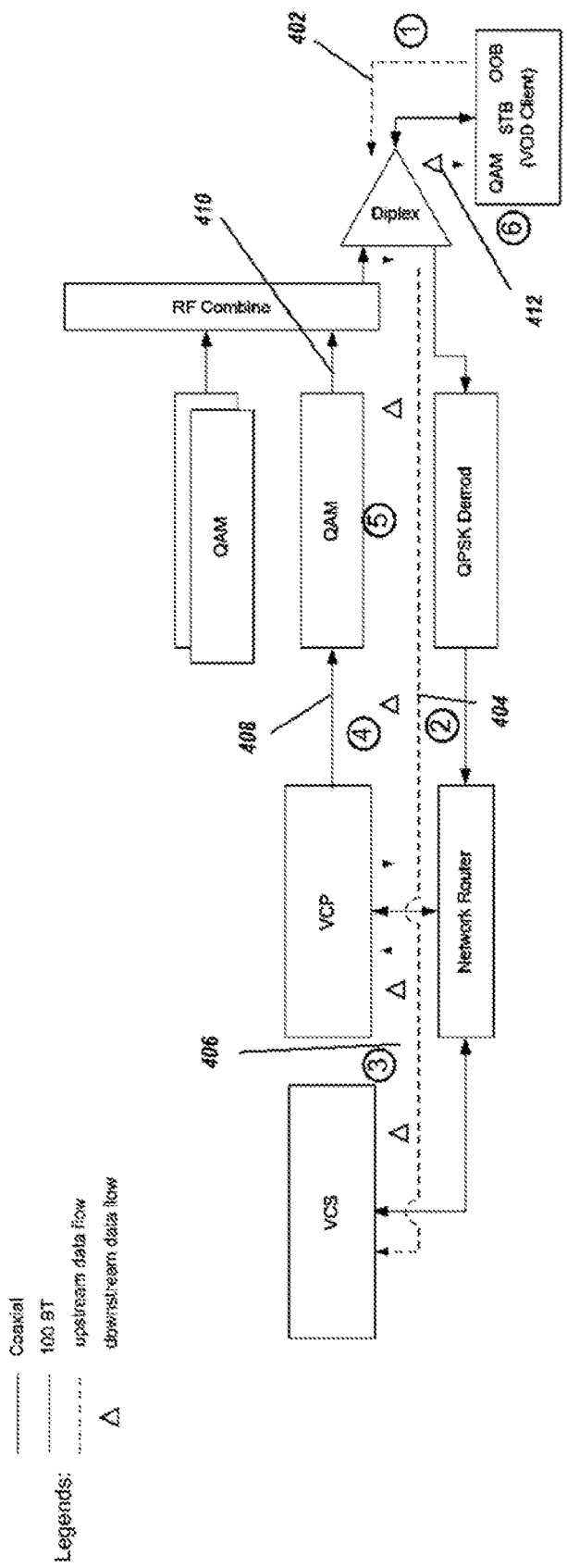
FIG. 4 is a high-level block diagram illustrating typical operation of a catalog data request within the network architecture of FIG. 3.

FIG. 4 shows an example of messaging/data flow within the exemplary architecture 300 of FIG. 3. In the illustrated example, the communication is always initiated from CPE/VOD client; however, it will be appreciated that the architecture and data flow may be modified if desired such that the communication is initiated by another entity, such as where for example the VCS 302 transmits a communication to the CPE VOD client to instigate a response from the client or user.

As shown in FIG. 4, the VOD client first sends a request for data through its OOB return channel (step 402). The request is received by the relevant RPD 307, and then routed to the VCS 302 (step 404). Per step 406, the VCS sends one or more replies to the VCP 304.

At step 408, the VCP encapsulates the data (e.g., to DigiCipher II section and transport stream (TS) packets using an appropriate PID). The client (CPE 206) MAC address is inserted within the DCII section as shown in the exemplary data of Table 1 below; appropriate PIDs for client addressing are also calculated as part of this process.

Next, per step 410, the encapsulated MPEG-2 transport data is QAM modulated at the QAM modulator 308, and transmitted over the network infrastructure (e.g., cable plant) 201. Lastly, per step 412, the CPE/VOD client receives the requested data (after hardware and software filtering performed at the CPE 206, or a gateway associated therewith).

TABLE 1

Exemplary Response Data Encapsulation to DigiCipher (DCII) Syntax

| Syntax | Bits | Mnemonic |
|---|---|---|
| dc2_data_carousel_section( ) { | | |
|   table_id | 8 | uimsbf |
|   section_syntax_indicator | 1 | bslbf |
|   reserved1 | 3 | bslbf |
|   section_length | 12 | uimsbf |
|   MAC_Address5_6 | 16 | uimsbf |
|   reserved2 | 8 | bslbf |
|   MAC_Address1_4 | 32 | uimsbf |
|   for (i=0; i<N; i++) { | | |
|     data_bytes( ) | | |
|   } | | |
|   CRC32 | 32 | rpchof |
| } | | |

Appendix I hereto further discussed and lists exemplary values for the foregoing DCII syntax elements.

In the illustrated implementation, the MAC address is split into two groups: the two least-significant bytes (bytes 5 and 6) are stored early in the section, with the remaining following later. This approach allows hardware section filters (which can often only filter on the first few bytes of a section) to filter based on the MAC address. If the platform (CPE 206 or gateway—not shown) does not support hardware filtering bytes 1-4 of MAC address, this function can be accomplished with a software filter with very minimum CPU and memory requirements, since the hardware filter has already eliminated most of the unwanted data.

To further utilize hardware filtering capability of the CPE, the exemplary implementation makes use multiple data streams to carry the catalog response data. The MAC address is used to calculate which data stream PID a CPE should use, so as to further eliminate unwanted data that is targeted for other STBs. In the exemplary embodiment, each PID has a stream descriptor included in the PMT. The descriptor tag "$p_i$" with the index "i" ranging from 00 to 31 is used to identify response data PIDs 0-31. The fourth byte of the MAC address is used to calculate "i"; specifically:

$$i = (4^{th} \text{ byte of MAC}) \& 0x1F \quad \text{Eqn (3)}$$

For example, catalog response data targeted for a CPE 206 with the MAC address 00:0A:BC:F1:2A:3B will be sent on a PID with descriptor tag "p17" (0xF1&0x1F=17). On the receiving side, the CPE 206 uses its MAC address to calculate the PID from which it will receive data, and then set its PID filter with the calculated PID value.

Hardware filtering on all 6 bytes of the (48-bit) MAC address may not be supported on some platforms/CPE. In such cases, software filtering (e.g., on bytes 1-4 of the MAC address) is required. The CPU and memory required to perform software filtering is advantageously minimal, because the amount of data and average bitrate of unwanted data is so low after the (partial) hardware filtering conducted by the CPE. Specifically:

$$\text{Average data rate per PID: 32 Mbps/32(PIDs)=1 Mbps} \quad \text{Eqn. (4)}$$

The average data rate after the section (bytes 4-5 of MAC address) filter is applied:

$$1 \text{ Mbps}/(2^{16}) \sim = 15 \text{ bps}. \quad \text{Eqn. (5)}$$

With the combination of using 5 bits of the $4^{th}$ byte (for PID selection), and the $5^{th}$-$6^{th}$ bytes (tableId extension filtering), hardware filtering on the CPE ingress can address $2^5 \ast 2^6 = 2,097,152$ (~2.1 million) unique CPE. The probability of having two CPE on the same network headend 150 with less than 1 million CPE that have the same last 21-bits of their MAC address is exceedingly low. Accordingly, the CPE CPU overhead required for software filtering is minimal after the aforementioned hardware filtering is applied.

In the exemplary implementation, a given CPE 206 can access the response data that has been targeted to it by setting the PID and tableId filter using its MAC address, as discussed supra. When a viewer starts a VOD session, the CPE can tune to the second program (i.e., Program 2 in FIG. 3A) that contains the "two-way" data first, read the PMT, and obtain the PID value it should subsequently use. Since the PID value used for any particular CPE will not change, the PID value should be kept and used during the entire session when CPE is tuned to the VOD carousel QAM. Once the PID value is obtained from the PMT, the PID (and table) filter can be set without having the CPE repeat the process (i.e., tune to Program 2 again). Accordingly, the CPE can tune to Program 1 (that carries the barker A/V streams 342) for the rest of the time it stays on the VOD carousel QAM. For that reason, the barker audio and video streams in Program 2 are optional (and hence optimally deleted).

Solution 2—Deletion of Barker Duplication and Bandwidth Requirement Reduction

Figure 5:
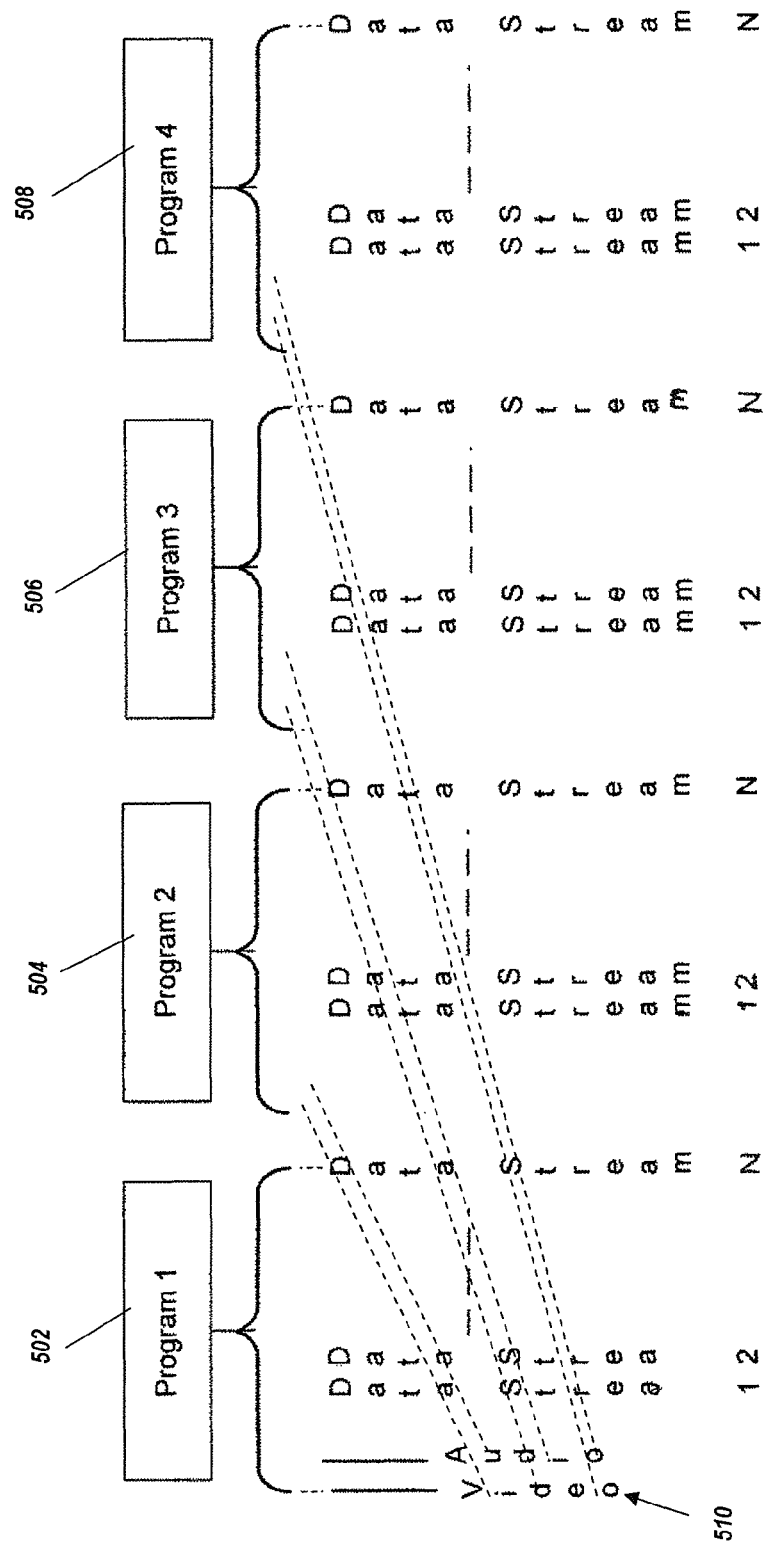
FIG. 5 is a graphical representation of a VOD catalog service including a plurality (e.g., four) programs and a single common barker channel that are formed into an MPTS according to another embodiment of the disclosure.

Referring now to FIG. 5, a second exemplary solution for achieving increased (VOD) catalog data capacity within a content distribution network is described in detail. In this second approach, bandwidth that would otherwise be consumed by the carriage of multiple (e.g., 4) concurrent and identical barker channels (as shown and discussed with respect to FIG. 1 supra) is in effect reclaimed through deletion of the duplicated barker channels, and hence more titles can be supported.

As shown in the prior art arrangement of FIG. 1, 4 SPTS's have identical barker channels; the total bandwidth consumed by these four barker channels is approximately 4×3.75=15 Mbps in the exemplary cable plant application. In contrast, in the embodiment of FIG. 5, the content of duplicative channels (e.g., 3 of the 4 barker channels of FIG. 1) is deleted, and multiple carousel programs share a single barker channel 510. The A/V streams of the sole barker channel 510 are included in a single program stream (e.g., Program 1 502 as shown in FIG. 5) of the existing 4 program streams 502, 504, 506, 508; the remaining program streams retain the program IDs (PIDs) of the A/V data (e.g., catalog response) streams in their program mapping tables (PMTs), but share same barker A/V streams 510 as Program 1 502.

In the exemplary embodiment of FIG. 5, the carousel server resident at the headend 250 concurrently outputs an MPTS (multi-program transport stream) which includes all of the programs, as opposed to the four SPTS in the current (prior art) implementation of FIG. 1.

The MPTS from the carousel server output is passed through to the QAM; this approach permits retention of the program structure and A/V PIDs shared among the programs 502, 504, 506, 508.

Additionally, in another aspect of the disclosure, barker channel bandwidth can be further reduced (to about 1.5 Mbps in the exemplary implementation; i.e., (1.25 mbps video, less than or equal to 196 kbps audio, and 10 kbps PSI) by reducing the resolution of barker video stream (e.g., to 360×240). This reduction may be accomplished since the barker channel video is only displayed on the user's rendering device (e.g., television) in a scaled window; for instance, one of less than ¼ (25%) of the full screen size of the rendering device. At higher resolutions, the additional bandwidth necessary to support the higher resolution is in effect wasted, since the scaled window can only utilize effectively ¼ thereof (the CPE down-samples the higher bandwidth signal, in effect throwing away ¾ of the received data). Approximately 13.5 Mbps worth of bandwidth can be reclaimed by such resolution reduction.

In the exemplary cable plant implementation, the foregoing resolution change can advantageously be accomplished by merely adjusting the relevant encoder parameter (e.g., adjust the barker channel encoder video resolution to 360×240, bitrate to ~1.25 mbps, and TS rate to 1.5 mbps), and without changing any code on the carousel server.

Hence, through (i) elimination of 3 of the 4 extant barker channels (savings=approx. 13.5 Mbps), and (ii) reduction of the resolution, and hence video bandwidth required for the remaining (nominally) 3.75 Mbps stream to 1.5 Mbps, approximately only 10% of the bandwidth used under the prior barker channel approach of FIG. 1 is used in the exemplary implementation of the present disclosure. Stated differently, the bandwidth available under the present embodiment herein for carriage of non-barker related data is (38.8 Mbps-1.5 Mbps)/(38.8 Mbps-15 Mbps), or 56% greater than that under the prior art approach of FIG. 1. This additional capacity can allow either (i) the current carousel (e.g., 7500 or so titles) to operate faster, or (ii) carry additional titles (on the order of 4K-5K more titles in the exemplary cable system application) at about the same latency.

It is appreciated that the foregoing solution has the advantage of requiring no client device (CPE) VOD client changes. Moreover, minimal carousel server changes are required to support the remapping/elimination of redundant barker channel A/V streams described above. Specifically, the existing PMT is reconfigured with respect to Programs 2-4 504, 506, 508 so as to share the A/V PIDs of Program 1 502. Additionally, as noted above, the output changes from 4 SPTS (FIG. 1) to a single MPTS (FIG. 5). This approach provides a simplified QAM configuration, in that only one MPTS needs to be passed through to the QAM modulator, versus configuration of 4 separate carousel programs.

It will also be appreciated that the foregoing approach (i.e., Solution 2) can also be used to share data streams. For instance, in the case of EBIF (Enhanced TV Binary Interchange Format), the same EBIF application can be shared between different programs. For example, sharing the same Home Box Office™ (HBO) EBIF application on all HBO channels, instead of different EBIF applications per individual channel. The foregoing example works in much the same way as sharing the barker audio/video streams (as discussed elsewhere herein). EBIF data streams only need to be included in one program, and then all the other programs sharing the EBIF application simply add the PIDs and associated descriptors of EBIF data streams to their PMT.

In yet another EBIF-based scenario, only the EBIF data carousel can be shared, yet not the EISS signaling, such that the different channels can still utilize the same EBIF application, but the application is signaled at different times. Using HBO as an example, the HBO application may only permit enhanced applications during commercials, and each channel has different commercial timing. Accordingly, the HBO EBIF application can be sent at any time the time (and shared between different programs), and the signaling can be sent separately to different channels at the prescribed times to control application life cycles on different HBO channels.

It will be recognized that while certain aspects of the disclosure are described in terms of a specific sequence of steps of a method, these descriptions are only illustrative of the broader methods, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claims herein.

While the above detailed description has shown, described, and pointed out novel features of the disclosure as applied to various embodiments, it will be understood that various omissions, substitutions, and changes in the form and details of the device or process illustrated may be made by those skilled in the art. The foregoing description is of the best mode presently contemplated. This description is in no way meant to be limiting, but rather should be taken as illustrative of the various general principles of the disclosure.

APPENDIX I

Exemplary DCII Syntax Values table_id—Can be any value between 0x40 and 0xfb that is not reserved by MPEG standard
section_syntax_indicator—The section_syntax_indicator is a 1-bit field which is set to 0.
reserved1—This 3-bit field is reserved and is set to '100'.
section_length—This 12-bit field specifies the number of bytes in the section starting immediately following the section_length field. The value in this field SHALL not exceed 1021, indicating that the encapsulated data_bytes( ) has a maximum length of 1010 bytes.
MAC_Address5_6—The original name for this field is filter_info. This 16-bit field is intended to accommodate hardware filtering of messages. It should be set to the last two bytes of STB MAC address.
reserved2—This 8-bit field is set to 0x00.
MAC_Address1_4—This is an added field for this application. It should contain the first 4 bytes of STB MAC address for hardware or software filtering.
Data_bytes( )—This field is the actual payload of the section, it carries the response data of two-way request. The maximum length of data_bytes is 1010 bytes.
CRC-32—This field is set as defined in IEC 13818-1, Annex B.

What is claimed is:

1. A method of operating a content distribution network having a plurality of users associated therewith, so as to provide content catalog services, the method comprising:
providing a plurality of data streams comprising a single Enhanced TV Binary Interchange Format (EBIF) application that is shared between a plurality of different programs;
associating the shared EBIF application with a single quadrature amplitude modulated (QAM) channel;
forming the shared EBIF application and a single secondary content stream associated to individual ones of the plurality of data streams into a common stream for delivery via the QAM channel;
dynamically adjusting an encoding resolution of the secondary content based at least in part on a display resolution at which it is determined the secondary content will be displayed; and
delivering the common stream to each of the plurality of users, such that each of the users can access the shared EBIF application and the single secondary content stream.

2. The method of claim 1, wherein the single secondary content stream comprises a barker stream comprising at least one audio stream and at least one video stream.

3. The method of claim 2, wherein the content distribution network comprises at least one of: (i) a hybrid fiber coaxial (HFC) network, and (ii) a hybrid fiber copper (HFCu) network.

4. The method of claim 2, wherein the barker stream is configured to be rendered within some fraction of a full sized rendering device screen, and the act of adjusting the encoding resolution comprises reducing an encoding resolution of at least one of the at least one audio stream and/or the at least one video stream prior to the act of forming.

5. The method of claim 1, wherein the catalog data streams are encoded using an MPEG-2 encoding process, and the common stream comprises a multiple program transport stream (MPTS).

6. The method of claim 1, wherein the act of associating comprises configuring a program mapping table (PMT) with respect to each of the catalog data streams so as to share one or more program IDs (PIDs).

7. The method of claim 1, wherein one or more second applications are configured to add individual ones of a plurality of plurality of program identifiers (PIDs) and associated descriptors to a program mapping table (PMT) therefor.

8. The method of claim 1, further comprising sending the EBIF application to individual ones of a plurality of channels at given times of a day.

9. The method of claim 8, wherein the act of sending the EBIF application comprises signaling the individual ones of a plurality of channels to utilize the EBIF application at given times of a day.

10. A method of operating a content distribution network having a plurality of users associated therewith, so as to provide content catalog data, the method comprising:
utilizing a first channel to carry a catalog data request originated from one of the plurality of users;
utilizing a catalog data service on a second channel to carry a first portion of the catalog data and a plurality of secondary content associated therewith for use by each of the plurality of users;
removing from the catalog data service one or more duplicate ones of the secondary content;
utilizing a third channel to carry a second portion of the catalog data for use by only the one of the plurality of users, the second portion corresponding to data requested by the one of the plurality of users; and
enabling a consumer device to filter the third channel so as to identify the second portion targeted for only the one of the plurality of users.

11. The method of claim 10, wherein the first portion is broadcast via the catalog data service to each of the plurality of users.

12. The method of claim 10, wherein the first channel comprises an upstream out-of-band (OOB) channel, and the second channel comprises an in-band (IB) content delivery QAM channel.

13. The method of claim 12, wherein the QAM channel can carry greater than 7,500 up to 30,000 titles.

14. The method of claim 10, wherein the first portion comprises: (i) a barker channel content, and (ii) top-level catalog data.

15. The method of claim 10, wherein the second portion further comprises addressing data specific to a consumer premises equipment (CPE) of the one user.

16. The method of claim 10, wherein the enabling the consumer device to filter third channel comprises utilizing a media access control (MAC) address of the CPE associated with the one of the plurality of users.

17. A method of operating a content distribution network having a plurality of users associated therewith, so as to provide content catalog data, the method comprising:
- utilizing an upstream out of band channel to carry a catalog data request originated from one of the plurality of users;
- utilizing a catalog data service on a second channel to carry a first portion of the catalog data and barker channel data for broadcast delivery to the plurality of users;
- utilizing a third channel to carry a second portion of the catalog data for use by only the one of the plurality of users, the second portion corresponding to data requested by the one of the plurality of users; and
- utilizing a media access control (MAC) address of a consumer device associated with the one of the plurality of users, thereby enabling the consumer device to filter the third channel so as to identify the second portion targeted for only the one of the plurality of users.

18. The method of claim 17, further comprising removing from the catalog data service one or more duplicate ones of the barker channel data.

* * * * *